United States Patent [19]

Mori

[11] 4,285,757
[45] Aug. 25, 1981

[54] TAPE END JOINING APPARATUS

[76] Inventor: Eizo Mori, 145-7, 3-Chome, Okubo-Cho, Moriguchi-Shi, Osaka, Japan, 573

[21] Appl. No.: 26,347

[22] Filed: Apr. 2, 1979

[30] Foreign Application Priority Data

Apr. 4, 1978 [JP] Japan ................................. 53-40676

[51] Int. Cl.³ ........................ B31F 5/06; G03D 15/04
[52] U.S. Cl. .................................. 156/350; 156/379; 156/497; 156/505
[58] Field of Search ............... 156/157, 304, 505, 379, 156/497, 506, 64, 502, 159, 304.3, 350, 378

[56] References Cited

U.S. PATENT DOCUMENTS

| 1,396,895 | 11/1921 | Stolz ..................................... 156/505 |
| 2,348,237 | 5/1944 | Barr et al. ......................... 156/502 X |
| 3,537,940 | 11/1970 | Nagano ................................ 156/505 |
| 3,554,842 | 1/1971 | Byrt ..................................... 156/505 |
| 3,558,405 | 1/1971 | Seda ..................................... 156/506 |
| 4,162,183 | 7/1979 | Estes ..................................... 156/505 |

Primary Examiner—Michael G. Wityshyn
Attorney, Agent, or Firm—Bacon & Thomas

[57] ABSTRACT

The invention is concerned with an improved construction of apparatus for adhesively joining together each end of thin and pliable tapes such as magnetic tapes usable for tape recorders and computers.

2 Claims, 6 Drawing Figures

TAPE END JOINING APPARATUS

BACKGROUND OF THE INVENTION

The present invention relates generally to improvements in a tape end joining apparatus, and more particularly to an improved type tape end connecting instrument that always serves, for editorial purposes, to inseparably adhere each end of such magnetic tapes in fixed position for example as tapes used for a computer to numerically memorize all informations obtained thereby and for a tape recorder to phonetically and acoustically register all sounds caught thereby.

Generally, a continuity of recorded magnetic tape must be edited by cutting it into pieces in selected positions and joining each of pieces in contiguous relation to one another, taking care not to allow the ends to be overlapped with one another nor to allow a gap to be formed therebetween.

However, the difficulties with the magnetic tape are that it is thin enough to be pliable and too narrow in width to visually confirm that the cut ends of pieces are held contiguously in position with one another, thus resulting in the joining operation of the pieces often being inaccurate.

STATMENT OF OBJECTS

Accordingly, the present invention has been designed to eliminate the above-mentioned drawbacks and disadvantages, having as one of its main objects the provision of a tape end joining apparatus that can easily and promptly effect the joining operation.

Another object of the invention is to provide a tape end joining apparatus wherein two tape ends are brought into abutment with one another in a guide groove having a tape joining portion bored with a plurality of vents for inhaling air so as to stick said ends fast to one another thereby joining the ends contiguously together, free of a fear that otherwise they might be bent upward due to the pliability peculiar to the thin and narrow tape.

Another object of the invention is to provide a tape end joining apparatus wherein the tape joining portion of said tape guide groove is formed with a light penetrable member under which a source of light is provided so as to make it possible to visually confirm the positional relation between two tape ends by the light applied thereto.

Another object of the invention is to provide a tape end joining apparatus provided with a tape joining member for holding an adhesive tape in position so as to contiguously join tape ends by pressing the adhesive tape against the two tape ends and their adjacent portions which have their foremost edges held contiguously with one another within a tape guide groove.

Another object of the invention is to provide a tape end joining apparatus adapted that when two tape ends are abutting on one another, light is automatically emitted thereto from a source of light therebelow whereby an editor is able to not only intend to begin a joining operation at each signal of the light but also free himself from eyestrain that otherwise he might have due to the duration of light that is kept on being emitted before and during the operation. This has a further advantageous result of economy on electrical consumption.

A further object of the invention is to provide a tape end joing apparatus wherein a particular tube is adapted to intercommunicate a tape joining member with an inlet chamber in a casing thereby dispensing with an independent inhaling means which gives an attracting power to the tape joining member, with results that the apparatus per se is structurally much simplified and producible at a very low cost of manufacture.

A still object of the invention is to provide a tape end joining apparatus wherein an air pressure detecting means is formed by boring a hole through the inlet chamber, said hole being covered with a stretchable diaphragm thereby to detect a lowering of air pressure in the inlet chamber, said air pressure detecting means being provided with a switch means for checking the operational condition of the diaphragm thereby to simplify the structure of the detecting means.

BRIEF DESCRIPTION OF DRAWINGS

These and other objects, features and advantages of the invention will become apparent from the following detailed description of the invention when taken in conjuction with the accompanying drawings, in which.

DESCRIPTION OF INVENTION IN RELATION TO DRAWINGS

Figure 1:
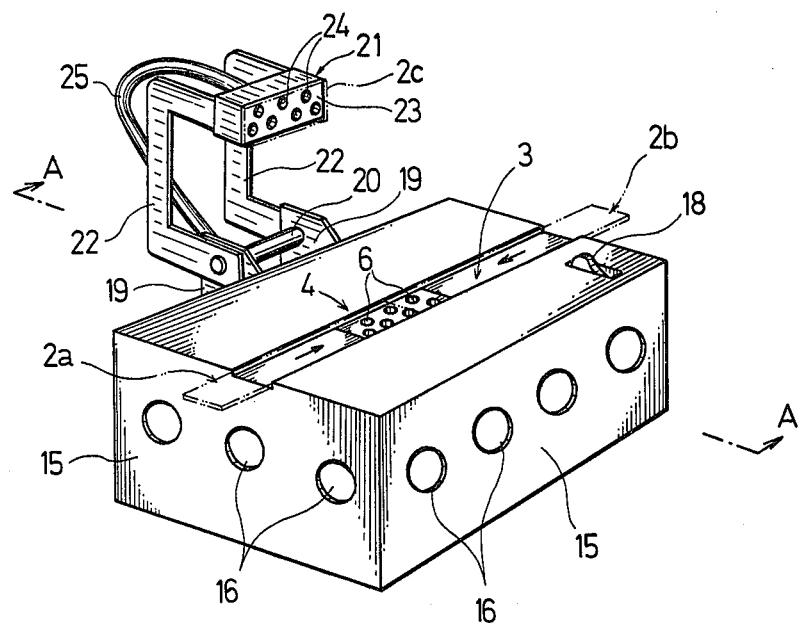
FIG. 1 is a perspective view showing a tape end joining apparatus embodying the invention.
Figure 2:
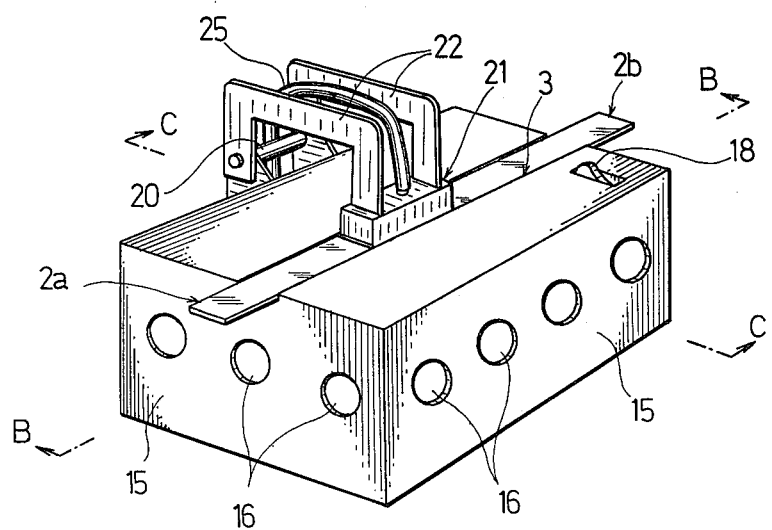
FIG. 2 is a perspective view showing a tape end joining apparatus, wherein a tape joining member is pressed against tape ends on a tape guide groove.

Setting forth now in detail a few preferred embodiments of the present invention with reference to the accompanying drawings, in which especially in FIG. 1, a tape end joining apparatus in accordance with the invention comprises a casing 1 and a tape guide groove 3 which is engraved straight across the upper surface of the casing 1 and adapted to receive a pair of opposite tape ends 2a, 2b inserted along the groove 3.

Said tape guide groove 3 is provided intermediate the ends thereof with a tape end joining portion 4 formed by a light penetrable member 5 which is preferably made of either a transparent or translucent sheet material and bored with a plurality of diametrally small inlets 6.

Figure 3:
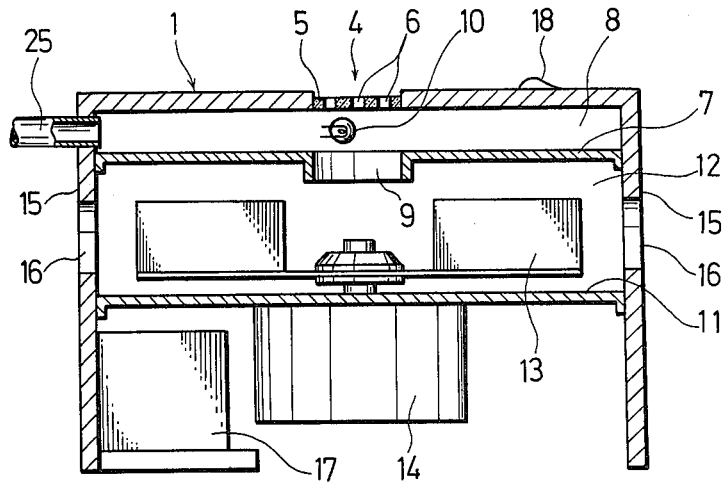
FIG. 3 is a vertical cross sectional view taken on the line of A—A in FIG. 1.
Figure 4:
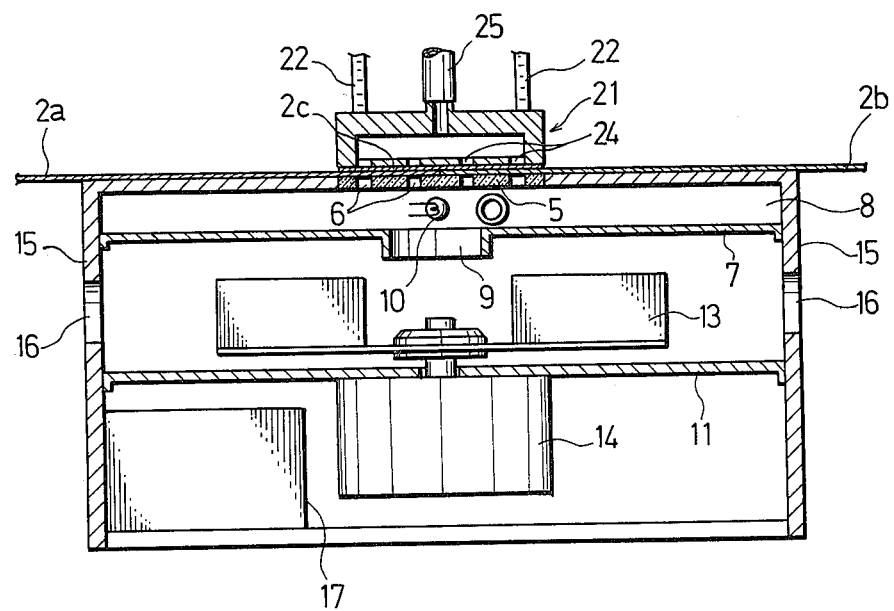
FIG. 4 is a vertical cross sectional view taken on the line of B—B in FIG. 2.

As is clearly shown in FIG. 3, said casing 1 is internally partitioned by means of a partition wall 7 under said tape guide groove 3 thereby to form an inlet chamber 8. Said inlet chamber 8 has a vent 9 so formed intermediate of the partition wall 7 just below the tape joining plortion 4 and is thus intercommunicated with an outlet chamber 12.

Further in said inlet chamber 8 adjacent to the lower surface area of the light penetrable member 5 there is mounted a lamp 10 which serves as a source of light. Mounted in said outlet chamber 12 is a fan 13 adapted to inhale a quantity of air, being disposed in such a position that the intermediate portion of the fan 13 and said vent 9 of the partition wall 7 are placed in opposed relation to one another. Said fan 13 is driven by means of a torque motor 14 mounted below the partition wall 11.

On the periphery of said outlet chamber 12 there are formed a plurality of outlets 16 so that air from the inlet chamber 8 is exhausted outward through the vent 9, the outlet chamber 12 and the outlets 16 resulting in an air inhaling force that acts toward the inside of the casing 1.

Incidentally said lamp 10 and said motor 14 are connected respectively to an electric source 17 through a switch means 18. The casing 1 is provided, at the side of one edge thereof parallel to the tape guide groove 3, with a pair of brackets 19 which pivotally support ends of substantially U shaped arms 22 through a shaft 20 while the other ends fixedly support a tape joining or adhering member 21 having a flattened surface area 23 wherein a joining or adhesive tape 2c (provided at one side thereof with an adhesive surface) is held in position. Said flattened surface area 23 is bored with a plurality of inlets 24 for pneumatically attracting the adhesive tape 2c.

Said tape joining member 21 is internally hollow and so provided that when the arms 22 are moved down about the shaft 20 as their respective fulcrum, said flattened surface area 23 that holds a piece of adhesive tape 2c in position is made to overlap with the tape joining portion 4, accompanied with joining or adhering effect enhanced by the aid of the above-mentioned inlets 24 of the flattened surface area 23.

Further the tape joining member 21 is intercommunicated with the inlet chamber 8 of the casing 1 through means of a flexible tube 25 so as to pneumatically attract the non-adhesive backside of the joining or adhesive tape 2c by the inhaling power of the fan 13 mounted in the outlet chamber 12.

When joining two tape ends 2a and 2b together in closely contiguous relation with one another, the switch means 18 is turned on at the outset so as to light the lamp 10 and start to move the fan 13, ventilating air from the inlet chamber 8 whereby the inlets 6 of the tape joining portion 4 are made to produce an air inhaling stream directed into the casing 1 and at the same time the inlets 24 of the tape joining member 4 are also made to produce an air inhaling stream directed into the flexible tube 25.

Then the opposite edges of two tape ends 2a and 2b are inserted into the tape guide groove 3 respectively from the opposite end thereof, with the magnetic side of each tape end facing downward, until they reach the intermediate tape joining portion 4 along the groove 3. When said edges come into the light penetrable member 5 of the portion 4, they are pneumatically attracted by means of the inlets 6 thereby being prevented from bending upward of the groove 3.

As has been referred to in the foregoing, said light penetrable member 5 is adapted to be illuminated from the lower portion thereof with respect to the tape joining portion 4 so that the light from the source of light 10 is directed upwardly through the inlets 6 to the upper surface of the tape joining portion 4. This permits an editor to visually confirm the positional relation between the two tape ends 2a and 2b. Thus an editor is always able to joint the opposed edges of two tape ends 2a, 2b in a closely contiguous relation by visually confirming their positional relation, being set free of a fear that otherwise he might overlook either a gap or overlap between the edges.

For the adhesive tape 2c for adhesively joining the tape ends 2a and 2b together, a unilateral adhesive cellophane tape is preferably employed, for example. In this case, non-adhesive side of the cellophane tape 2c is pneumatically attracted to the flattened surface area 23 of the tape joining member 21. Thereafter the arms 22 are moved until the tape joining member 21 is pressed down against the contiguous edges of the tape ends 2a, 2b on the tape joining portion 4 thereby adhesively joining the tape ends together by means of the adhesive side of the cellophane tape 2c. Thereafter the tape joining member 21 is moved back in the direction away from the tape joining portion 4 as is shown in FIG. 1 of the accompanying drawings and then the switch means 18 is turned off to put out the lamp 10. In synchronism therewith the fan 13 halts, the inlets 6 and 24 ceasing their air inhaling actions, ultimately providing the time to remove a length of joined tape ends 2a, 2b from the tape guide groove 3.

Figure 5:
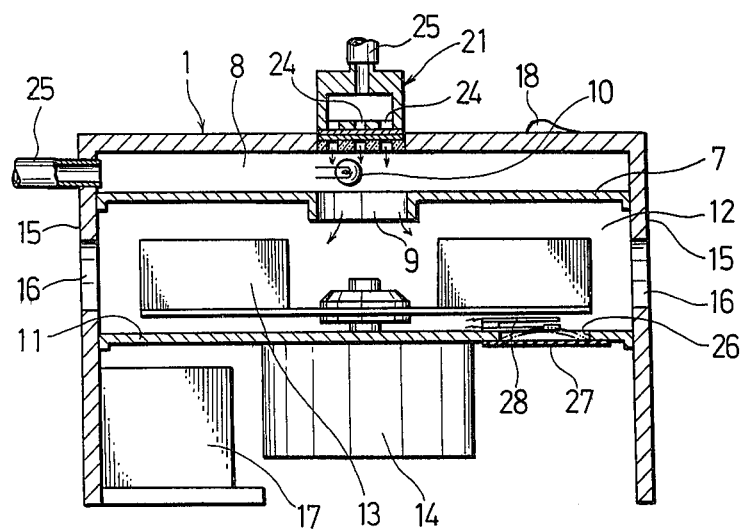
FIG. 5 is a vertical cross sectional view taken on a line corresponding to line C—C in FIG. 2, showing another embodiment of the invention.
Figure 6:
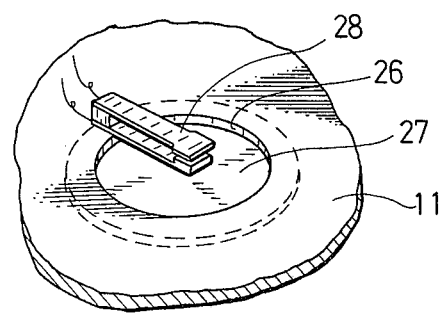
FIG. 6 is a perspective view showing elemental parts of both a switch means and a diaphragm which form an air pressure detecting means for detecting a lowering of air pressure in the inside of the inlet chamber.

Description will now be made of another embodiment of the invention as shown in FIG. 5, according to which the lamp 10 is adapted to be automatically switched on when the two tape ends 2a, 2b are in proximity to one another, but automatically switched off the moment the tape ends are adhesively joined together. For a fuller understanding, the partition wall 11 under the outlet chamber 12 is bored with a through hole 26 which is covered with a stretchable diaphragm 27 in air-tight sealed relation as a sample of air pressure detecting means for the inlet chamber 8 or the outlet chamber 12.

Said diaphragm 27 is adapted to be readily deflected upwardly with respect to the plane of the partition wall 11 in proportion to the lowering of air pressure in the inside of the outlet chamber 12. In this connection, the lowering of air pressure in the inside of the outlet chamber 12 implies the lowering of air pressure in the inlet chamber 8 so that the upward deflection of said diaphragm 27 provides a provident detectability as to the lowering of air pressure in the inlet chamber 8. It follows from this, therefore, that although said diaphragm 27 is provided on the partition wall 11 under the outlet chamber 12 in the present embodiment, yet it is also possible to provide the same diaphragm 27 on the partition wall 7 that partitions the inlet chamber 8 off the outlet chamber 12. Disposed over the upper surface of said diaphragm 27 is a spring switch means 28 which has its one end rigidly fixed about the periphery of the through hole 26. Said switch means 28 is adapted to be actuated by the upward motion of the diaphragm 27.

Similarly to the preceding embodiment, the lamp 10 of the present embodiment is connected through the switch means 28 to the electric source 17, the motor 14 being connected through the switch means 18 to the electric source 17.

In case of joining the two tape ends 2a and 2b together, the switch means 18 is turned on. Then the tape ends are inserted into the tape guide groove 3 respectively from the opposite end thereof until they reach the intermediate tape joining portion 4 along the groove 3. Then the edges of the tape ends 2a, 2b are in proximity to one another, the air pressure between the inlet chamber 8 and the outlet chamber 12 is lowered to deflect the diaphragm 27 upwardly with respect to the plane of the partition wall 11 whereby the spring switch means 28 is pushed up to be actuated, resulting in the lamp 10 being switched on to illuminate the tape joining portion 4 from the lower portion thereof. When the foremost edges of the tape ends 2a, 2b are exactly contiguous to one another, the tape joining member 21 is pressed against the tape ends by moving the arms 22 downwardly thereby adhesively joining the same ends to the adhesive side of the cellophane tape 2c.

After the joining operation is over, the switch means 18 is turned off to halt the fan 13. Then the inlet chamber 8 and the outlet chamber 12 are both loaded with air pressure equal to atmospheric pressure so that the diaphragm 27 returns to its original state to turn off the spring switch means 28, automatically causing the lamp 10 to be switched off.

Incidentally, said vents 6 described and illustrated as being formed intermediately only of the tape guide groove 3 in the embodiments of the present invention may be formed over all of the groove 3.

There will now be obvious to those skilled in the art many modifications and variations of the above described structure. These modifications and variations will not depart from the scope of the invention as defined by the following claims.

What is claimed is:

1. A tape end joining apparatus comprising a casing having an inlet chamber that is internally provided with pneumatically attracting means and has an upper surface area engraved with a tape guide groove having at least a part thereof forming a light permeable tape joining portion bored with a plurality of vents to said inlet chamber, and a source of light below said tape joining portion, an air pressure detector arranged to detect a lowering of air pressure in said inlet chamber, and a switch, responsive to said air pressure detector, for lighting said source of light when tape ends in said groove cover said vents.

2. A tape end joining apparatus as defined in claim 1 wherein a port is provided in communication with said inlet chamber, said air pressure detector comprising a flexible diaphragm covering said port.

* * * * *